United States Patent [19]

Rosenthal et al.

[11] Patent Number: 4,816,347

[45] Date of Patent: Mar. 28, 1989

[54] HYBRID TITANIUM ALLOY MATRIX COMPOSITES

[75] Inventors: Dan G. Rosenthal, Huntington; Joseph A. Goebel, Hamden, both of Conn.

[73] Assignee: Avco Lycoming/Subsidiary of Textron, Inc., Stratford, Conn.

[21] Appl. No.: 55,415

[22] Filed: May 29, 1987

[51] Int. Cl.⁴ .............................................. B23K 28/00
[52] U.S. Cl. .................................... 428/615; 428/607; 428/608; 428/614
[58] Field of Search ................ 428/614, 615, 607, 608

[56] References Cited

U.S. PATENT DOCUMENTS

| | | | |
|---|---|---|---|
| 3,556,837 | 1/1971 | Hammond | 428/608 |
| 3,676,293 | 7/1972 | Gruber | 428/608 |
| 3,849,080 | 11/1974 | Zechmeister | 428/608 |
| 4,010,884 | 3/1977 | Rothman | 428/607 |
| 4,141,802 | 2/1979 | Duparque et al. | 428/608 |
| 4,499,156 | 2/1985 | Smith et al. | 428/614 |
| 4,622,270 | 11/1986 | Yamamura et al. | 428/608 |

OTHER PUBLICATIONS

Petrova et al., in Ti and Ti-Alloys, vol. 3, ed.: Williams et al., Plenum, N.Y., 1976, p. 2419.

Primary Examiner—Upendra Roy
Attorney, Agent, or Firm—Perman & Green

[57] ABSTRACT

A combination of unique properties of (i) high strength and stiffness at temperatures up to about of 1500° F., (ii) good room temperature mechanical properties including good ductility and (iii) improved resistance to matrix cracking is achieved in a titanium structure by forming a hybrid titanium alloy matrix composite in which the matrix consists of layers of at least two alloys, i.e. a high temperature-resistant titanium aluminide alloy and a ductile, lower modulus titanium alloy, that are bonded metallurgically to each other in various embodiments. A reinforcing material in the form of filaments, fibers or wiskers, e.g. silicon carbide, can be embedded within either or both types of the titanium layers.

32 Claims, 2 Drawing Sheets

HYBRID TITANIUM ALLOY MATRIX COMPOSITES

BACKGROUND OF THE INVENTION

I. Field of the Invention

This invention relates generally to metal matrix composite materials such as titanium alloy matrix composites, and more particularly to hybrid titanium alloy matrix composites which exhibit the combined properties of high strength and stiffness at elevated temperatures, good ductility, and good resistance to matrix cracking.

II. The Prior Art

Various types of power turbine engine components are conventionally fabricated from different kinds of steel, nickel and titanium alloys. In use, these components are typically subjected to rather severe environmental conditions which require the components to have a combination of diverse properties generally not found within most individual materials. To overcome this type of problem in the gas turbine industry, hybrid metal and composite components, such as for example shafts, have been constructed. Following the example of a shaft, this component must withstand the torsional and bending stresses typically placed on small diameter drive shafts used in a turbine engine. This process can result in a fully consolidated hybrid shaft having a metal outer shell, e.g. steel or nickel, and a metal matrix composite inner sleeve, e.g. titanium matrix composite. However, when these materials are bonded together they generally do not form high-strength metallurgical bonds thereby resulting in the possibility of an easy failure of the material during use by fracture.

Titanium alloys are among the more desirable structural materials useful for manufacturing a component for a gas turbine. This is because titanium alloys have the combination of high strength and low density. However, generally speaking, commercially available alloys are limited in use to lower temperature ranges (below about 800° F.) because of decreasing creep strength and oxidation resistance at elevated temperatures. At the higher temperature ranges (above about 1000° F.) higher density materials such as iron, nickel and cobalt base superalloys have been used. However, it is still desirable to use the lightweight titanium base material at elevated temperatures because the lower weight of titanium reduces the amount of stress on the material when the material forms a rotating component.

The prior art presently discloses a wide variety of various metal matrix composite materials exhibiting a wide variety of properties. Some specific examples of these prior art disclosures are as follows:

U.S. Pat. No. 3,427,185 to Cheatham, et al. discloses a composite structural material incorporating metallic filaments in a matrix. The metal matrix material has a melting point higher than the recrystallization temperature of the filamentary material and is deposited thereon by plasma and spraying.

U.S. Pat. No. 3,455,662 to Alexander, et al. discloses a high strength whisker reinforced metallic monofilament wherein the whiskers are aligned in the elongate direction of the monofilament. The whiskers are present in the form of a roving with the metal matrix applied by electroplating, vapor deposition or the like. Suitable whisker materials are the metallic and non-metallic oxides, carbides, nitrides, silicides and borides.

U.S. Pat. No. 3,556,836 to Hammon discloses a composite of a plurality of pairs of alternating layers made by vapor deposition of materials wherein one is ductile relative to the other. One layer is referred to as a high strength "fibrous" material while the other is a ductile matrix material. Suitable fibrous materials include boron, carbon, silicon, beryllium and the refractory metals as well as ceramic compounds and the carbides, borides, nitrides and silicides thereof. Suitable ductile materials include aluminum, beryllium, magnesium, scandium, iron, nickel, copper, titanium and the like. No disclosure of titanium alloys is made.

U.S. Pat. No. 3,676,293 to Gruber discloses a laminated article comprising a layer of a skeletal structure of fibrous silicon carbide which is bonded with at least one layer of carbon. The fibers may further be used as reinforcing elements in metal matrixes.

U.S. Pat. No. 3,691,623 to Staudhammer, et al discloses a process for increasing the whisker and fiber content in a matrix wherein layers of whiskers aligned on a metal substrate are stacked into a preform assembly and diffusion bonded to consolidate the preforms into a composite foil. Various materials are suitable as both the whiskers and the matrix.

U.S. Pat. No. 3,849,080 to Zechmeister discloses a rotationally symmetrical hollow compound body having a metal matrix reinforced with metallic or non-metallic fibers. The body may comprise a layer of fiber reinforced matrix such as an aluminum alloy on which another layer, such as an aluminum-titanium alloy is deposited without any metallurgical bonding.

U.S. Pat. No. 4,010,884 to Rothman discloses a method of fabricating a filament-reinforced composite article comprising monolayer boron fiber tapes and laminates of titanium. The boron fibers are attached to an aluminum foil which is interleaved with titanium and diffusion bonded to bond the fibers in a matrix of aluminum and titanium. This disclosure is different from the invention described herein in many ways. First, the Rothman disclosure is limited to and depends on combinations of aluminum and titanium. Second, the Rothman disclosure specifically describes that the fabrication temperature of the composite must not exceed 1050° F. The fabrication temperature of the composite described by the present invention must exceed 1050° F. in view of the materials used in the composite. Third, it appears that the utilization temperature of the composites described by Rothman must be well below 1050° F., and most probably in the range of 400° F. to 500° F. On the other hand, the composite described by the present invention is aimed at utilization temperatures in the range of about 1500° F. maximum.

U.S. Pat. No. 4,141,802 to Duparque, et al discloses fiber reinforced metal panels and the production thereof wherein the panels comprise a metal foil to which is adhered a fiber reinforced metal matrix layer. A thin layer of a bonding metal or alloy is interposed between the foil and the reinforced matrix.

U.S. Pat. No. 4,499,156 to Smith, et al., discloses titanium metal matrix composites wherein the titanium alloy has high strength. High stiffness filaments, such as silicon carbide or the like are embedded in the composite producing substantially reduced reaction zones.

SUMMARY OF THE INVENTION

It is therefore an object of the present invention to provide novel hybrid titanium metal matrix composites which are substantially devoid of the disadvantages exhibited by the many composites described in the prior art.

It is another object of the present invention to form a matrix of two or more different titanium alloys, referred to herein as a hybrid matrix, that involves the concept of tailoring matrix properties to optimize composite properties.

It is another object of the present invention to provide novel hybrid titanium metal matrix composites that exhibit a combination of properties of (i) high strength and stiffness at temperatures up to about 1500° F., of (ii) good room temperature mechanical properties including good ductility and (iii) improved resistance to matrix cracking.

It is still another object of this invention to extend the operating limits of titanium metal matrix composites to higher temperatures by making use of high temperature matrix aluminide alloys, such as $Ti_3Al$, which because of its low ductility and high elastic modulus at room temperature is unsatisfactory as a composite matrix and is marginally satisfactory in monolithic structures because these structures are prone to cracking.

The foregoing objects and other objects of the present invention are accomplished by a hybrid titanium metal matrix composite capable of providing good strength at temperatures up to about 1500° F. and good ductility as defined by the features and embodiments as described herein.

One embodiment of the present invention comprises a hybrid titanium metal matrix composite article having a layer of a titanium aluminide alloy metallurgically bonded to a layer of a titanium alloy. The layer of titanium alloy may be formed to contain a plurality of filaments, fibers or whiskers e.g. silicon carbide, embedded therein.

Another embodiment of the present invention comprises a hybrid titanium metal matrix composite article having a plurality of alternating layers of a titanium alloy and a titanium aluminide alloy, the layers of titanium alloy being separated from each other by a layer of a titanium aluminide alloy to which the adjoining titanium alloy is metallurgically bonded. The layers of titanium alloy may contain a plurality of filaments, fibers or whiskers e.g. silicon carbide, embedded therein.

Another embodiment of the present invention comprises a hybrid titanium metal matrix composite having a first layer of a titanium aluminide alloy, a second layer of a titanium alloy formed to have a plurality of filaments, fibers or whiskers, e.g. silicon carbide, embedded therein, and a third layer of a different titanium alloy. A composite article is preferably formed by metallurgically bonding a plurality of these three layered configurations together.

BRIEF DESCRIPTION OF THE DRAWINGS

FIGS. 3A and 3B and 4A and 4B illustrate cross-sectional representations of other embodiments of the present invention wherein hybrid composites are formed of layers of a titanium aluminide alloy, a titanium alloy and a filament layer, the filament layer being interposed between titanium alloy layers to form a hybrid composite containing the filaments embedded within the titanium alloy layers;

DESCRIPTION OF THE PREFERRED EMBODIMENTS

Figure 1A:
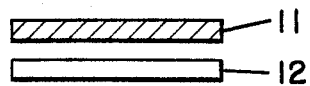
FIGS. 1A and 1B and 2A and 2B illustrate cross-sectional representations of embodiments of the present invention wherein hybrid composites are formed of alternating layers of a titanium alloy and a titanium aluminide alloy.
Figure 1B:
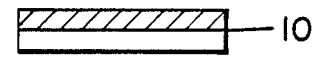
Figure 2A:
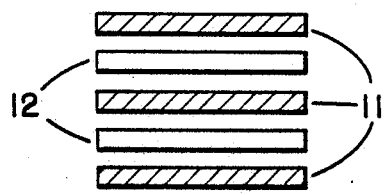
Figure 2B:
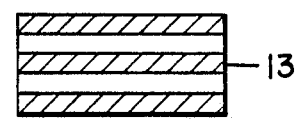

FIGS. 1A and 1B and 2A and 2B illustrate in accordance with the features of embodiments of the present invention, multi-layered titanium aluminide/titanium alloy hybrid composites designated generally as 10 in FIG. 1B and 13 in FIG. 2B from which parts can be manufactured for use in, for example, a high pressure ratio compressor or power turbine where high strength/density is required. Composites 10 and 13 are formed by superposing alternating layers of a titanium aluminide foil 11 and a titanium alloy foil 12, as shown in prebonded conditio in FIGS. 1A and 2A, and metallurgically bonding the layers together to form the hybrid composite structures 10 and 13. The two alloy matrices 10 and 13 that are formed are referred to as hybrid matrices or composites because a primary feature of the present invention involves the concept of tailoring matrix properties to optimize the overall composite properties. For example, in order to extend the operating limits of titanium metal matrix composites to successful use at higher temperatures, high temperature matrix materials such as titanium aluminides ($Ti_3Al$, TiAl, etc) are used.

All figures given herein to describe amounts of elements within alloy compositions are percent by weight figures except when written as stoichiometric intermetallic compounds, such as $Ti_3Al$ and TiAl, in which case the formula indicates the atom ratio.

The hybrid composites described herein comprise layers o titanium alloy and titanium aluminide alloy. In accordance with the preferred features of the present invention described herein various conventional titanium alloys can be used as the low temperature, lower modulus, ductile titanium alloy component. Examples of some of these titanium alloys include Ti-6Al-4V (Ti-64), Ti-15V-3Cr-3Sn-3Al(Ti-15-3), Ti-6Al-2Sn-4Zr-6Mo (Ti-6246) and Ti-5Al-6Sn-1Mo-0.25Si (Ti-5621S). Several alpha-2/ $Ti_3Al$ type alloys can be used as the high temperature aluminide alloy component of the hybrid structure described herein. Examples of some of these aluminide alloys include Ti-14Al-25Nb and Ti-14Al-20Nb-3V-2Mo. In principle gamma titanium aluminide (TiAl), such as Ti-32Al-1.5V-0.1C, can also be used for the high temperature aluminide component. This gamma aluminide would provide potentially higher temperature capability for the metal matrix composite. The layers of either titanium alloy foil or titanium aluminide foil can vary in thickness, but it has been found in accordance with the preferred features of the present invention of the preferred thickness of each of the layers be in the range of about 0.001 to 0.010 inches.

Figure 3B:
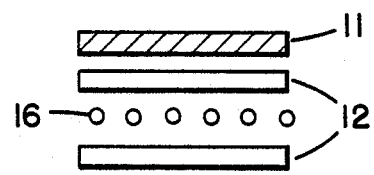
Figure 3B:
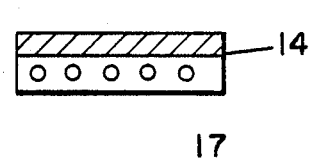
Figure 4A:
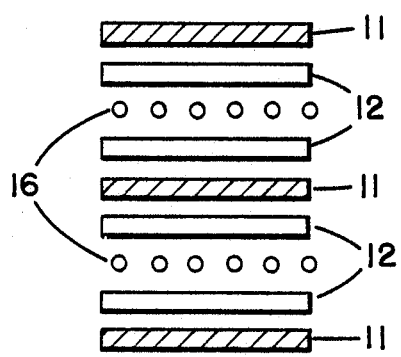
Figure 4B:
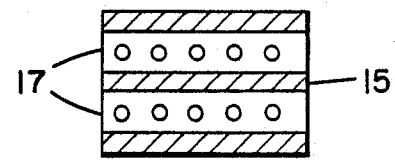

FIGS. 3A and 3B and 4A and 4B illustrate other embodiments of multi-layered titanium aluminide/titanium alloy hybrid composites in accordance with the features of the present invention designated generally as 14 in FIG. 3B and 15 in Fig. 4B. Composites 14 and 15 are formed by superposing layers of titanium aluminide foil 11, a titanium alloy foil 12, and fiber matrix layer(s) 16, as shown in prebonded condition in FIGS. 3A and 4A.

The filament matrix layer(s) 16 are positioned between layers 12 of titanium alloy so that when the assembly is metallurgically bonded to form the hybrid composites 14 and 15 of FIGS. 3B and 4B, each fiber matrix layer 16 is enveloped within a pair of the ductile titanium alloy layers 12 to form filament-reinforced titanium alloy strata 17 in the hybrid composites 14 and 15.

Also, most preferably the outermost layers used to form the hybrid composites, such as 13 of FIG. 2B and 15 of FIG. 4B, consist of the more temperature-resistant titanium aluminide layers 11.

The metal matrix composites as described in the prior art tend to make a distinction between filaments which are relatively large in diameter (i.e. 0.001-0.011 inches) and fibers or whiskers which are generally finer. In accordance with the present invention filaments, fibers or whiskers can be embedded within the titanium alloy layers. Thus, when the terms filaments is used herein (in the specification or claims) they are intended to mean that fibers or whiskers can be substituted for the filaments and that either filaments, fibers or whiskers can be used. In addition, the various materials given as examples of filaments can also be used as fibers or whiskers. Furthermore, in accordance with the present invention, various types of filaments can be embedded within the composite structure, such as for example, filaments made of silicon carbide, boron, $B_4C$, $TiB_2$, $Al_2O_3$, tungsten and molybdenum. The filaments can also be coated for the primary purpose of resisting any reaction with the matrix material that the fibers are embedded within. Generally speaking the filaments are coated with a material that is chosen depending primarily upon the composition of the filament itself. Thus, for example, boron filaments are preferably coated with $B_4C$. The filaments can be oriented in the titanium alloy layer in any way depending on the desired properties. For example, the filaments can have unidirectional orientations or others, e.g. bias ply, cross ply, etc., depending on the specific directional properties that are desired.

The present invention may be better understood through reference to the following example.

EXAMPLE

Hybrid composites 10, 13, 14 and 15 were fabricated from Ti-14Al-25Nb (aluminide alloy) and Ti-6Al-4V (titanium alloy), silicon carbide filaments being included to form composites 14 and 15. After degreasing and acid etching of the foils, the silicon carbide filaments were arranged as layers 16 between aluminum alloy layers 12 as shown in FIGS. 3A and 4A. Silicon carbide filaments in the form of a woven fabric were used as layers 16 to achieve control of filament spacing and alignment. The fabric had a titanium ribbon cross-weave (fill). Layers 16 of silicon carbide fabric and foils 11 and 12 were assembled in carbon steel frames (cans) which were evacuated and sealed. After this the cans were diffusion-bonded by HIPing (Hot Isostatic Pressing) at 1750° F. for 1 hour at 15 ksi. After HIPing the cans were dissolved with acid to provide the hybrid composites 10, 13, 14 and 15.

Figure 5A:
FIGS. 5A and 5B illustrate cross-sectional representations of another embodiment of the present invention wherein a hybrid composite is formed of alternating layers of pre-formed filament-reinforced titanium aluminide alloy and titanium alloy.
Figure 5B:
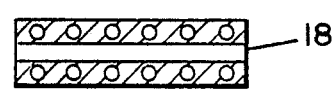

Vapor deposition methods (CVD, PVD,) and cathodic arc methods can be used to produce the titanium aluminide layers used to fabricate any of the hybrid composites shown in the Figures including the use of pre-alloyed metal powders. For example, the embodiment of a hybrid composite 18 as shown in FIG. 5B was manufactured by applying a layer of titanium aluminide (Ti-38Al) by CVD on silicon carbide filaments to form fiber-reinforced titanium aluminide layers 19, and stacking these with Ti-6A-4V titanium alloy foils 20, as shown by FIG. 5A, followed by HIP consolidation at a temperature between about 1700°-1800° F. and a pressure of about 15 ksi for a period of about 1 hour. The result is a composite 18 as shown in FIG. 5B including a plurality of layers of fiber-enveloped titanium aluminide bonded together by a layer of a titanium alloy. Filaments may have two alloys directly deposited thereon, or use a combination of one alloy deposited plus one alloy foil. Each approach preferably uses HIP consolidation. Foil availability and/or ease of vapor deposition can dictate the particular approach selected.

Figure 6A:
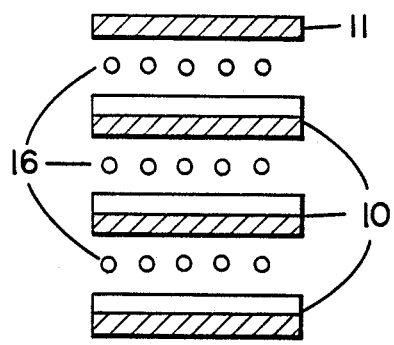
FIGS. 6A and 6B illustrate cross-sectional representations of other embodiments of the present invention wherein a hybrid composite is formed of titanium aluminide layers, pre-formed titanium aluminide/titanium alloy composites, and fiber layers, metallurgically bonded together.
Figure 6B:
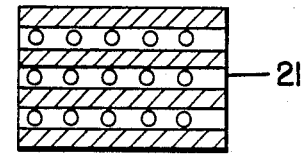

In the embodiment of FIGS. 6A and 6B the hybrid composite 10 of FIG. 1B is assembled with interposed fiber matrix layers 16 and a top layer 11 of titanium aluminide, as shown by FIG. 6A, and the assembly is metallurgically bonded to produce the hybrid composite 21 of FIG. 6B in which the fiber matrix is embedded within the ductile titanium alloy strata provided by composites 10, in contact with the less ductile titanium aluminide strata.

Figure 7A:
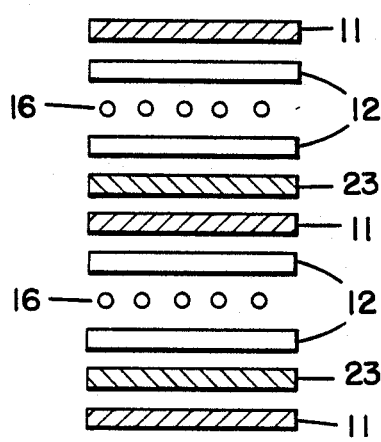
FIGS. 7A and 7B illustrate cross-sectional representations of other embodiments of the present invention wherein a hybrid composite is formed from layers of a titanium aluminide, a filament matrix interposed between layers of titanium alloy, and layers of a different titanium alloy.
Figure 7B:
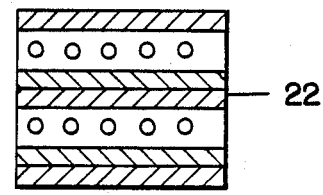

FIGS. 7A and 7B illustrate another hybrid composite 22 embodiment formed from a plurality of layers comprising titanium aluminide 11, titanium alloy 12, layers of a different titanium alloy 23 and filament matrix layers 16. The formed hybrid composite 22 comprises the fiber matrix layers 16 enveloped within the ductile titanium alloy layers or foils 12, and the layers or foils 23 of the different titanium alloy bonded within the composite 22 to lend their properties thereto. For example, titanium alloy layers or foils 23 can be used which have intermediate ductility, elastic modulus and temperature resistant properties to provide property variations which are gradual rather than abrupt so that stresses would be distributed more uniformly between the filaments.

Figure 8A:
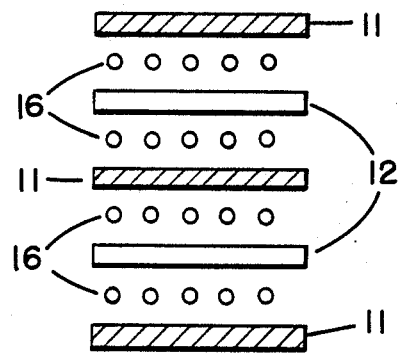
FIGS. 8A and 8B illustrate cross-sectional representations of other embodiments of the present invention wherein a hybrid composite is formed from layers of titanium aluminide having interposed therebetween single layers of titanium alloy sandwiched between filament matrix layers.
Figure 8B:
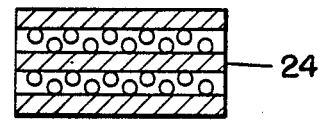

According to the embodiment of FIGS. 8A and 8B the hybrid composites 24 of FIG. 8B containing a high density of enveloped filaments can be produced by assembling titanium aluminide foils 11, titanium alloy foils 12 and fiber matrix layers 16 in the order shown by FIG. 8A, and metallurgically bonding the layers to form the hybrid composite 24 of FIG. 8B. Since each ductile titanium alloy foil 12 is interposed between two filament matrix layers 16, each of which is also adjacent a titanium aluminide foil 11, the bonding process causes the two filament layers 16 to become integrated with and enveloped by the titanium alloy foil 12 to produce a double-density of the filaments therewithin the formed hybrid composite 24.

Using the present methods several titanium aluminide/titanium alloy hybrid composites were fabricated. Excellent diffusion bonding was obtained between layers. Tensile tests were performed at room temperature and 1200° F. for the laminated alloy composite of alpha (Ti-14Al-25Nb) and Ti-64 which indicated superior room temperature strength and ductility versus alpha-2 and 1200° F. properties equivalent to alpha-2. The following Table I gives the yield strength, ultimate tensile strength and percent elongation:

TABLE I

|  | Room Temperature | | | 1200° F. | | |
| --- | --- | --- | --- | --- | --- | --- |
|  | YS (ksi) | UTS (ksi) | El (%) | YS (ksi) | UTS (ksi) | El (%) |
| Hybrid (no Filaments) | 135 | 162 | 3.1 | 116 | 131 | 20 |
| Aluminide-Alpha-2 (Typical) | 112 | 124 | 2.0 | 72 | 92 | 17 |
| Alloy-Ti-64 (typical) | 150 | 160 | 10.0 | 65* | 110* | 28* |

*at 1000° F.

In addition to the improved tensile properties demonstrated above excellent creep and fatigue properties will also result. The exact improvement will depend on the relative quantities of each alloy and of reinforcement, as well as the alloy and filament compositions selected. For the type of composite tested it is expected that 1200° F. creep resistance will be equivalent to aluminide (alpha-2). For silicon carbide reinforced hybrid metal matrix composites, creep and fatigue resistance are expected to improve ten-fold compared to alloy constituents.

In accordance with the features of the present invention it is important to understand what is specifically meant by some of the terminology used herein and how this terminology affects the features of the present invention. "High temperature" for titanium alloys is generally considered to be in the range of 850°-1200° F. Only titanium aluminides and a few newly developed titanium alloys have capability of performing well in this range. Silicon carbide filament reinforcement extends that capability by 200°-300° F (e.g. to 1400°-1500° F.). "High strength" is more difficult to define, the goals in these elevated temperature ranges are on the order of 100 ksi or greater tensile strength. It is expected, in accordance with the features of this invention, to obtain a creep strength advantage (with filaments) of 200°-300° F. over the strongest alloys. Low temperature ductility of titanium aluminides is poor (typically less than 2% elongation in tension at fracture). Hybrid alloy structures (with conventional alloys) are more "ductile" with 3% or more elongation at fracture. It will be apparent to those skilled in the art, in the light of the present disclosure, that a plurality of other hybrid composites, in addition to those illustrated by the accompanying drawing, can be produced in accordance with the present invention by including additional or fewer layers or foils of titanium aluminide alloy and layers of more ductile titanium alloys and layers of filaments of different types, or by substituting filament-reinforced titanium aluminide layers 19 for the titanium aluminide layers or foils 11, or by incorporating one or more different titanium alloy layers or foils into any of the hybrid composites illustrated. The essential requirement is that each hybrid composite include at least one titanium aluminide layer or foil and at least one more ductile, lower modulus titanium alloy layer or foil, and that at least one exterior surface of the composite comprises the temperature-resistant titanium aluminide alloy.

It should be realized that illustrative embodiments only of the present invention have been provided above and that modifications to the illustrative embodiments may become apparent to those skilled in the art. Therefore, the embodiments disclosed herein are not meant to limit the invention is meant to be limited only as defined by the appended claims.

What is claimed is:

1. A hybrid titanium metal matrix composite article having good strength at temperatures up to about 1500° F. and good ductility comprising at least one layer of a titanium aluminide alloy having a minimum thickness of at least about 0.001 inch metallurgically bonded to at least one layer of a ductile titanium alloy, said composite article having substantially higher yield strength, ultimate tensile strength and % elongation ductility than said layer of titanium aluminide alloy at both room temperature and at 1200° F., and having substantially higher yield strength and ultimate tensile strength at 1200° F. than said layer of ductile titanium alloy has at 1000° F.

2. A composite article according to claim 1 wherein a plurality of filaments are embedded in said matrix.

3. A composite article according to claim 1 wherein said titanium aluminide comprises $Ti_3Al$ and/or $TiAl$.

4. A hybrid titanium metal matrix composite article according to claim 1 comprising a plurality of layers of a said ductile titanium alloy and layers of a said titanium aluminide alloy, each of the layers of titanium aluminide alloy being separated from each other by at least one layer of titanium alloy.

5. A hybrid titanium metal matrix composite article according to claim 1 comprising a plurality of layers of a said ductile titanium alloy and layers of a said titanium aluminide alloy, the layers of titanium aluminide alloy being separated from each other by one or more layers of the titanium alloy, at least some of the layers having a plurality of filaments embedded therein.

6. A hybrid titanium metal matrix composite article according to claim 1 comprising at least one said layer of a titanium aluminide alloy, at least one said layer of a ductile titanium alloy having a plurality of filaments embedded therein, and at least one layer of a different ductile titanium alloy having a composition and properties different from said other ductile titanium alloy layer.

7. A hybrid titanium metal matrix composite article according to claim 1 comprising at least one layer of a $Ti_3Al$ and/or $TiAl$ titanium aluminide alloy, and at least one layer of a ductile titanium alloy selected from the group consisting of Ti-64, Ti-5621S, Ti-15-3 and Ti-6246.

8. A composite article according to claim 2 wherein said filaments are embedded in at least some of said layers of titanium aluminide alloy.

9. A composite article according to claim 2 wherein said filaments are embedded in at least some of said layers of titanium alloy.

10. A composite article according to claim 2 wherein said filaments, comprise at least one material selected from the group consisting of boron, $B_4C$, $TiB_2$, $Al_2O_3$, silicon nitride, silicon carbide, tungsten and molybdenum.

11. A composite article according to claim 2 wherein said filaments comprise silicon carbide filaments.

12. A composite article according to claim 3 wherein a plurality of filaments are embedded in said matrix.

13. A composite article according to claim 4 in which said ductile titanium alloy layers comprise layers of different titanium alloys having different compositions and properties.

14. A composite article according to claim 4 wherein said titanium aluminide comprises $Ti_3Al$ and/or TiAl.

15. A composite article according to claim 4 wherein said ductile titanium alloy contains about 6% by weight aluminum, about 4% by weight vanadium and the balance titanium.

16. A composite article according to claim 5 wherein at least some of said layers of titanium alloy have a plurality of filaments embedded therein.

17. A composite article according to Claim 5 wherein said filaments comprise materials selected from the group consisting of boron, $B_4C$, $TiB_2$, $Al_2O_3$, silicon nitride, silicon carbide, tungsten and molybdenum.

18. A composite article according to claim 5 wherein said filaments comprise silicon carbide.

19. A composite article according to claim 5 wherein said titanium aluminide alloy is a $Ti_3Al$ alloy selected from the group consisting of titanium alloys containing about 14% by weight aluminum, about 25% by weight niobium, the balance titanium, and titanium alloys containing about 14% by weight aluminum, about 20% by weight niobium, about 3% by weight vanadium, about 2% by weight molybdenum and the balance titanium.

20. A composite article according to claim 5 wherein said titanium aluminide comprises $Ti_3Al$ and/or TiAl.

21. A composite article according to claim 5 wherein the thickness of each of the titanium ally layers measures between about 0.001 and about 0.010 inches.

22. A composite article according to claim 5 wherein the thickness of each of the titanium aluminide layers measures about 0.001 and about 0.010 inches.

23. A composite article according to claim 5 wherein said filaments are unidirectionally oriented.

24. A composite article according to claim 5 wherein said layers of titanium alloy and titanium aluminide are diffusion bonded to each other.

25. A composite article according to claim 5 wherein each layer of titanium alloy comprises a layer of titanium alloy with said filaments embedded therein and each layer of titanium aluminide alloy is free of said filaments.

26. A composite article according to claim 7 in which said titanium alloy layer includes a plurality of filaments.

27. A composite article according to claim 12 wherein said filaments are present within at least some of said layers of titanium aluminide alloy.

28. A composite article according to claim 12 wherein said filaments are embedded within at least some of said layers of titanium alloy.

29. A composite article according to claim 25 wherein each of said layers is metallurgically bonded to adjoining layers.

30. A composite article according to claim 26 wherein said filaments comprise silicon carbide.

31. A composite article according to claim 28 in which said filaments are embedded between and within adjacent layers of titanium alloy.

32. A composite article according to claim 28 in which two layers of said filaments are embedded within at least some of said layers of titanium alloy to provide a high density filament content.

* * * * *

UNITED STATES PATENT AND TRADEMARK OFFICE
CERTIFICATE OF CORRECTION

PATENT NO. : 4,816,347

DATED : March 28, 1989

INVENTOR(S) : Dan G. Rosenthal et al.

It is certified that error appears in the above-identified patent and that said Letters Patent is hereby corrected as shown below:

Column 10, claim 21, line 2, "ally" should read -- alloy --.

Column 10, claim 22, line 3, "about" should read -- between about --.

Signed and Sealed this

Twenty-sixth Day of September, 1989

Attest:

DONALD J. QUIGG

*Attesting Officer*   *Commissioner of Patents and Trademarks*